(12) United States Patent
Gao (10) Patent No.: US 11,550,090 B2
(45) Date of Patent: Jan. 10, 2023

(54) HIGH-CONTRAST POLARIZER

(71) Applicant: Moxtek, Inc., Orem, UT (US)

(72) Inventor: Liang Gao, Draper, UT (US)

(73) Assignee: Moxtek, Inc., Orem, UT (US)

( * ) Notice: Subject to any disclaimer, the term of this patent is extended or adjusted under 35 U.S.C. 154(b) by 295 days.

(21) Appl. No.: 17/075,900

(22) Filed: Oct. 21, 2020

(65) Prior Publication Data

US 2021/0055465 A1 Feb. 25, 2021

Related U.S. Application Data

(62) Division of application No. 16/269,854, filed on Feb. 7, 2019, now Pat. No. 10,852,464.

(60) Provisional application No. 62/637,095, filed on Mar. 1, 2018.

(51) Int. Cl.
*G02B 5/30* (2006.01)
*G02B 27/28* (2006.01)

(52) U.S. Cl.
CPC ......... *G02B 5/3058* (2013.01); *G02B 27/285* (2013.01)

(58) Field of Classification Search
CPC ... G02B 5/3058; G02B 27/285; G03B 21/005
See application file for complete search history.

(56) References Cited

U.S. PATENT DOCUMENTS

| | | | |
|---|---|---|---|
| 6,288,840 B1 | 9/2001 | Perkins et al. | |
| 6,665,119 B1 | 12/2003 | Kurtz et al. | |
| 7,570,424 B2 | 8/2009 | Perkins et al. | |
| 7,961,393 B2 | 6/2011 | Perkins et al. | |
| 8,755,113 B2 | 6/2014 | Gardner et al. | |
| 9,348,076 B2 | 5/2016 | Wang et al. | |
| 9,354,374 B2 * | 5/2016 | Wang | ........................ G02B 1/08 |
| 9,632,223 B2 | 4/2017 | Probst et al. | |
| 9,632,224 B2 | 4/2017 | Nielson et al. | |
| 9,684,203 B2 | 6/2017 | Nielson et al. | |
| 9,726,897 B2 | 8/2017 | Huang et al. | |
| 10,114,161 B2 | 10/2018 | Wang et al. | |
| 10,139,536 B2 | 11/2018 | Wang et al. | |
| 10,139,537 B2 | 11/2018 | Nielson et al. | |
| 10,139,538 B2 | 11/2018 | Wang et al. | |
| 10,175,401 B2 | 1/2019 | Nielson et al. | |
| 2003/0179345 A1 | 9/2003 | Ito et al. | |
| 2004/0120041 A1 | 6/2004 | Silverstein et al. | |
| 2005/0190445 A1 | 9/2005 | Fukuzaki | |
| 2007/0297052 A1 | 12/2007 | Wang et al. | |
| 2008/0013051 A1* | 1/2008 | Glinski | ............. G02F 1/133528 348/E9.027 |
| 2012/0075699 A1 | 3/2012 | Davis et al. | |
| 2014/0300964 A1 | 10/2014 | Davis et al. | |
| 2016/0062017 A1 | 3/2016 | Nielson et al. | |

(Continued)

*Primary Examiner* — Wen Huang (74) *Attorney, Agent, or Firm* — Thorpe, North & Western, LLP (57) ABSTRACT

A polarizer can have high contrast. This high contrast polarizer can be useful in applications requiring minimal leakage of an undesired polarization through the polarizer. The high contrast polarizer can include a substrate sandwiched between a reflective polarizer and an absorptive polarizer. The high contrast polarizer can include a reflective polarizer sandwiched between a substrate and an absorptive polarizer. The high contrast polarizer can include an absorptive polarizer sandwiched between reflective polarizers.

11 Claims, 6 Drawing Sheets

(56) References Cited

U.S. PATENT DOCUMENTS

| | | |
|---|---|---|
| 2016/0291208 A1* | 10/2016 | Wangensteen ....... G02B 5/3058 |
| 2017/0068103 A1 | 3/2017 | Huang et al. |
| 2017/0139095 A1 | 5/2017 | Nielson et al. |
| 2017/0184898 A1 | 6/2017 | Nielson et al. |
| 2017/0293059 A1 | 10/2017 | Nielson et al. |
| 2017/0322425 A1 | 11/2017 | Wang et al. |
| 2018/0052257 A1 | 2/2018 | Neilson et al. |
| 2018/0052270 A1 | 2/2018 | Neilson et al. |
| 2018/0259698 A1 | 9/2018 | Neilson et al. |
| 2018/0299687 A1 | 10/2018 | Gao et al. |
| 2019/0094435 A1* | 3/2019 | Shen ................. G02F 1/133528 |

\* cited by examiner

HIGH-CONTRAST POLARIZER

CLAIM OF PRIORITY

This is a divisional of U.S. patent application Ser. No. 16/269,854, filed on Feb. 7, 2019, which claims priority to US Provisional Patent Application No. 62/637,095, filed on Mar. 1, 2018, which is incorporated herein by reference.

FIELD OF THE INVENTION

The present application is related generally to wire grid polarizers.

BACKGROUND

Polarizers can divide light into two different polarization states. One polarization state can pass through the polarizer and the other can be absorbed or reflected. The effectiveness or performance of polarizers is based on a very high percent transmission of one polarization (e.g. Tp) and minimal transmission of an opposite polarization (e.g. Ts). It can be beneficial to have high contrast (e.g. Tp/Ts). Some applications require ultra-low Ts, and thus very high contrast.

SUMMARY

It has been recognized that it would be advantageous to have a polarizer with minimal transmission of one polarization (e.g. ultra-low Ts) and high contrast (e.g. high Tp/Ts). The present invention is directed to various embodiments of high-contrast polarizers that satisfy this need.

In one embodiment, the high-contrast polarizer can include an array of wires on a substrate, with channels between adjacent wires, each wire including an absorptive rib sandwiched between a pair of reflective wires.

In another embodiment, the high-contrast polarizer can comprise a reflective polarizer and an absorptive polarizer mounted together. The reflective polarizer can include an array of reflective wires over a first substrate. The absorptive polarizer can include an array of absorptive ribs on a second substrate. The array of reflective wires and the array of absorptive ribs can face inward and the first substrate and the second substrate can face outward.

In another embodiment, the high-contrast polarizer can comprise a polymer film polarizer sandwiched between a pair of reflective polarizers.

BRIEF DESCRIPTION OF THE DRAWINGS (DRAWINGS MIGHT NOT BE DRAWN TO SCALE)

DEFINITIONS

Normally, a wire grid polarizer is rotated and inclined for transmission of p-polarized light and for absorption or reflection of s-polarized light. Therefore, for simplicity of description, the primarily-transmitted polarization may be referred to as p-polarized light and the primarily absorbed or reflected polarization may be referred to as s-polarized light.

As used herein, the term "absorptive polarizer" means a polarizer capable of absorbing ≥70% of s-polarized light in the wavelength range of use.

As used herein, the term "channel" means a space, gap, or groove between adjacent items, such as for example between adjacent reflective wires or absorptive ribs. Each channel can extend from the substrate to a distal end of the wires or ribs, thus completely separating the wires or ribs from each other. The channels can be filled with liquid, gas, solid, vacuum, or combinations thereof.

As used herein, the term "reflective polarizer" means a polarizer capable of reflecting ≥70% of s-polarized light in the wavelength range of use.

As used herein, the term "nm" means nanometer(s).

As used herein, the terms "on", "located on", "located at", and "located over" mean located directly on or located over with some other solid material between. The terms "located directly on", "adjoin", "adjoins", and "adjoining" mean direct and immediate contact.

As used herein, the term "parallel" means exactly parallel, parallel within normal manufacturing tolerances, or nearly parallel, such that any deviation from exactly parallel would have negligible effect for ordinary use of the device.

As used herein, the term "polymer film polarizer" means an organic polarizer with an orientated polymer. The polymer is typically stretched.

As used herein, the term "substrate" means a base material, such as for example a glass wafer. The term "substrate" also includes multiple materials, such as for example a glass wafer with optical interference coating(s) on the wafer.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a specific wavelength range (e.g. ultraviolet, visible, or infrared spectrum) and can have a different property in a different wavelength range. Such materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

As used herein, materials with k≤0.1 in the specified wavelength range are "transparent" materials, materials with k>0.1 and R≤0.6 in the specified wavelength range are "absorptive" materials, and materials with k>0.1 and R>0.6 in the specified wavelength range are "reflective" materials.

DETAILED DESCRIPTION

Figure 1:
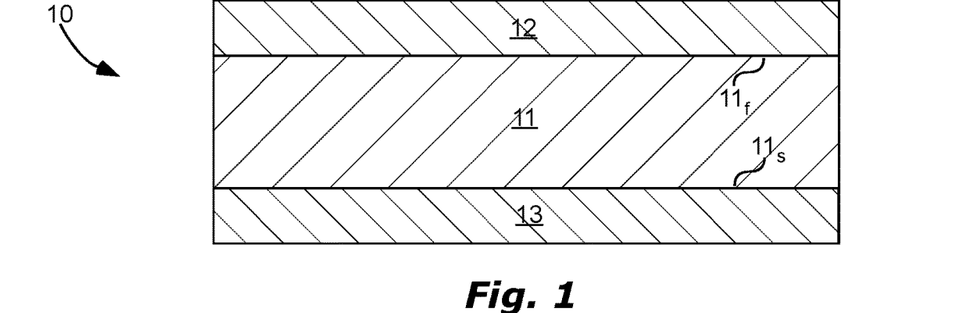
FIG. 1 is a schematic, cross-sectional side-view of a high-contrast polarizer 10 comprising a reflective polarizer 12 and an absorptive polarizer 13 on opposite sides of a substrate 11, in accordance with an embodiment of the present invention.

As illustrated in FIG. 1, a high-contrast polarizer 10 is shown comprising a substrate 11 having a first side $11_f$ and a second side $11_s$ opposite of the first side $11_f$. The substrate 11 can be transparent. A reflective polarizer 12 can be located on the first side $11_f$ of the substrate 11 and an absorptive polarizer 13 can be located on the second side $11_s$ of the substrate 11. The reflective polarizer 12 can adjoin the first side $11_f$ of the substrate 11, or another layer can be located between the reflective polarizer 12 and the first side $11_f$ of the substrate 11. The absorptive polarizer 13 can adjoin the second side $11_s$ of the substrate 11, or another layer can be located between the absorptive polarizer 13 and the second side $11_s$ of the substrate 11.

The reflective polarizer 12 can be any type of polarizer that substantially or mostly reflects one polarization (e.g. s-polarized light) and transmits an opposite polarization (e.g. p-polarized light). In one embodiment, as shown on high-contrast polarizer 20 in FIG. 2, the reflective polarizer 12 can include an array of reflective wires 22 with channels 21 between adjacent wires.

Figure 2:
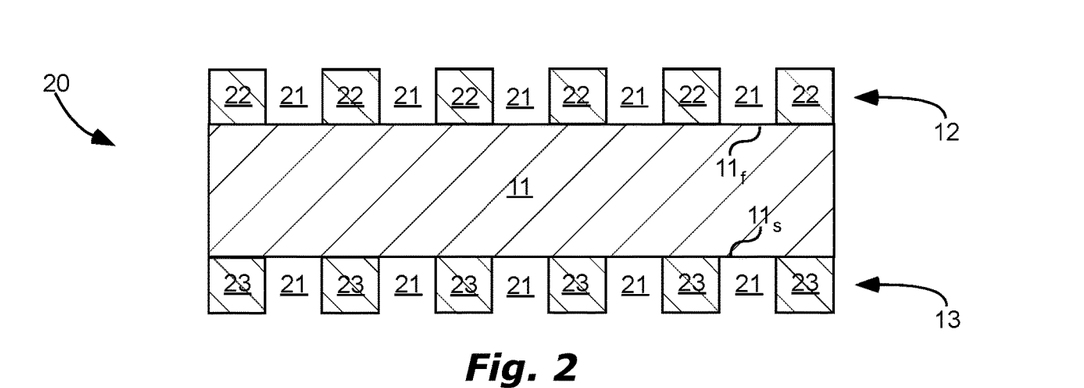
FIG. 2 is a schematic, cross-sectional side-view of a high-contrast polarizer 20, similar to high-contrast polarizer 10, but the reflective polarizer 12 including an array of reflective wires 22 and the absorptive polarizer 13 including an array of absorptive ribs 23, in accordance with an embodiment of the present invention.

The array of reflective wires 22 can be parallel and elongated. The array of reflective wires 22 can be configured for optimizing transmission of one polarization (e.g. p-polarized light) and for optimizing reflection (e.g. s-polarized light) of an opposite polarization. The array of reflective wires 22 can consist of reflective materials, transparent materials, or both.

In one embodiment, the absorptive polarizer 13 can be a polymer film polarizer. In another embodiment, as shown on high-contrast polarizer 20 in FIG. 2, the absorptive polarizer 13 can include an array of absorptive ribs 23 with channels 21 between adjacent wires. The array of absorptive ribs 23 can be parallel and elongated.

Figures 3, 4:
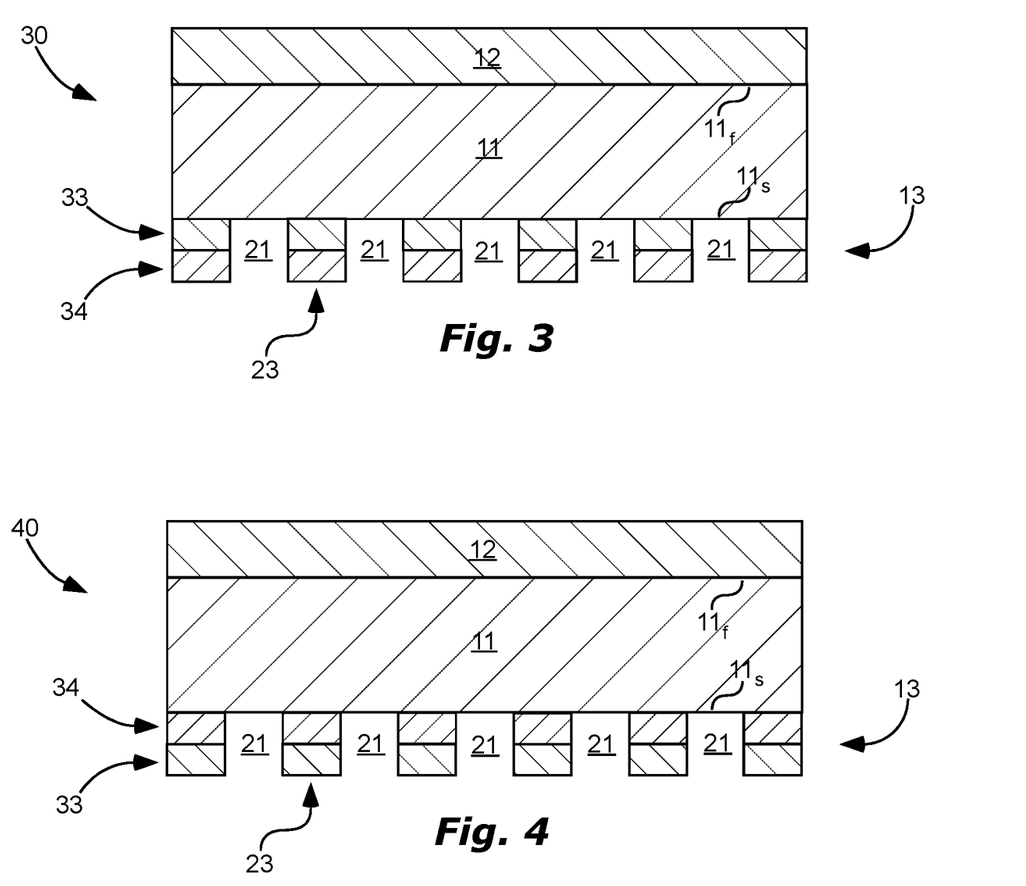
FIG. 3 is a schematic, cross-sectional side-view of a high-contrast polarizer 30, similar to high-contrast polarizer 10 or 20, but the absorptive polarizer 13 includes an array of absorptive ribs 23, each rib of the array of absorptive ribs 23 including a layer of absorptive material 33 sandwiched between a layer of reflective material 34 and the substrate 11, in accordance with an embodiment of the present invention.
FIG. 4 is a schematic, cross-sectional side-view of a high-contrast polarizer 40, similar to high-contrast polarizer 10 or 20, but the absorptive polarizer 13 including an array of absorptive ribs 23, each rib of the array of absorptive ribs 23 including a layer of reflective material 34 sandwiched between a layer of absorptive material 33 and the substrate 11, in accordance with an embodiment of the present invention.

As shown on high-contrast polarizer 30 in FIG. 3, each absorptive rib 23 can include a layer of absorptive material 33 sandwiched between a layer of reflective material 34 and the second side $11_s$ of the substrate 11. As shown on high-contrast polarizer 40 in FIG. 4, for each rib of the array of absorptive ribs 23, the reflective material 34 can be sandwiched between the layer of absorptive material 33 and the second side $11_s$ of the substrate 11. Thus, the term "absorptive ribs" can mean that an overall effect of such wires is to allow transmission of one polarization (e.g. p-polarized light) and substantially or mostly absorb an opposite polarization (e.g. s-polarized light).

Figure 5:
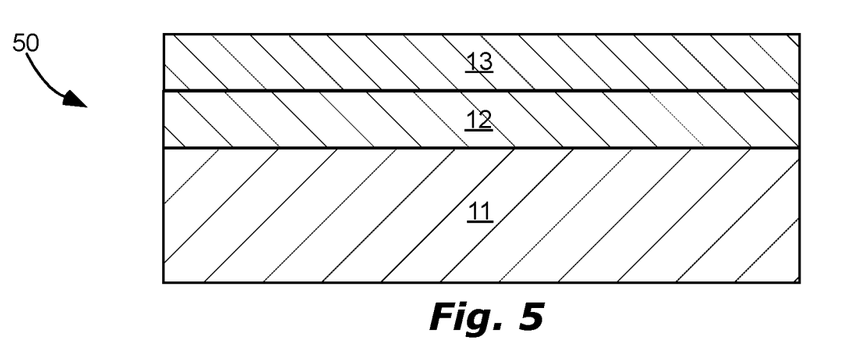
FIG. 5 is a schematic, cross-sectional side-view of a high-contrast polarizer 50, including a reflective polarizer 12 sandwiched between a substrate 11 and an absorptive polarizer 13, in accordance with an embodiment of the present invention.

As shown in FIG. 5, a high-contrast polarizer 50 can comprise a reflective polarizer 12 and an absorptive polarizer 13 on a substrate 11 with the reflective polarizer 12 sandwiched between the absorptive polarizer 13 and the substrate 11. The absorptive polarizer 13 can be any type of absorptive polarizer, including a polymer film polarizer or an array of absorptive ribs 23. The reflective polarizer 12 can be any type of reflective polarizer, including an array of reflective wires 22.

Figure 6:
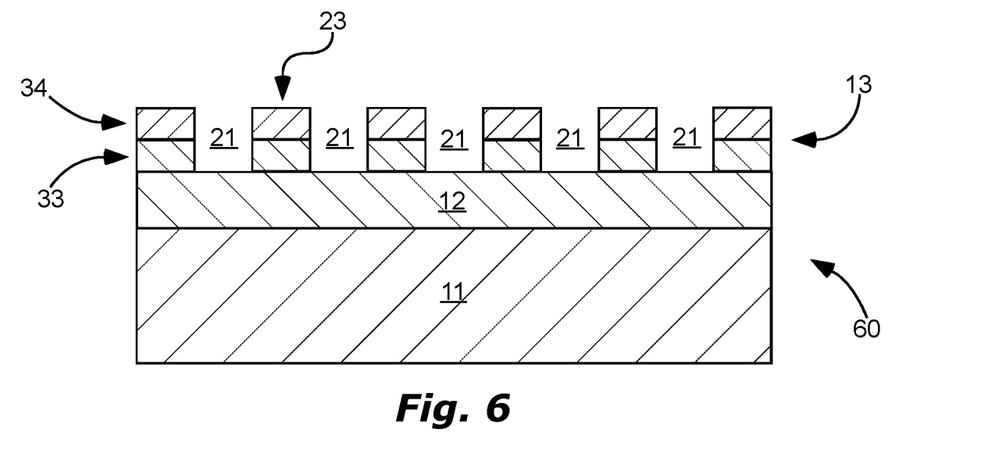
FIG. 6 is a schematic, cross-sectional side-view of a high-contrast polarizer 60, similar to high-contrast polarizer 50, but the absorptive polarizer 13 includes an array of absorptive ribs 23, each rib 23 including a layer of absorptive material 33 and a layer of reflective material 34, in accordance with an embodiment of the present invention.

High-contrast polarizer 60, shown in FIG. 6, is similar to high-contrast polarizer 50. The absorptive polarizer 13 of high-contrast polarizer 60 can include an array of absorptive ribs 23. Each rib 23 can include a layer of absorptive material 33 and a layer of reflective material 34. The layer of absorptive material 33 can be sandwiched between the layer of reflective material 34 and the reflective polarizer 12.

Figure 7:
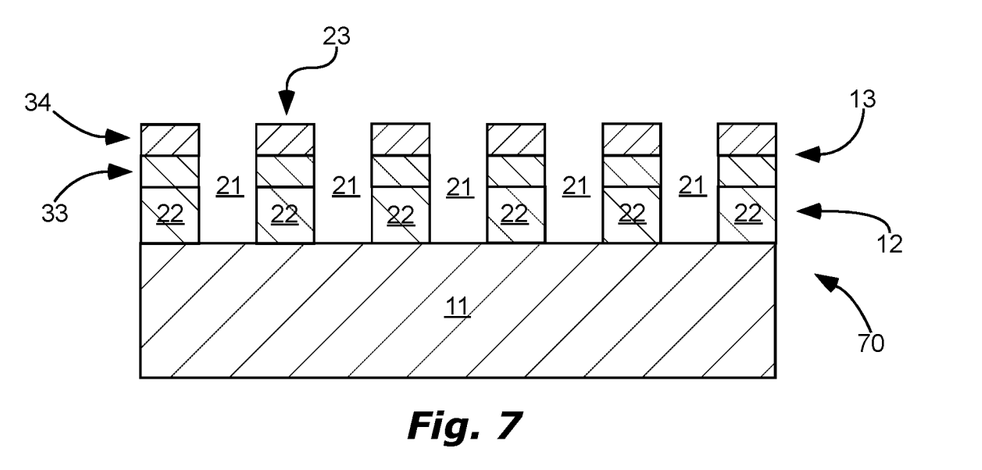
FIG. 7 is a schematic, cross-sectional side-view of a high-contrast polarizer 70, similar to high-contrast polarizer 60, but the reflective polarizer 12 including an array of reflective wires 22, which can be aligned with the absorptive ribs 23, in accordance with an embodiment of the present invention.

High-contrast polarizer 70, shown in FIG. 7, is similar to high-contrast polarizer 60. The reflective polarizer 12 of high-contrast polarizer 70 can include an array of reflective wires 22, with channels 21 between adjacent wires. Each rib 23 can be aligned with a wire 22. Each channel can thus extend between a rib 23 and wire 22. In other words, high-contrast polarizer 70 can include an array of wires on the substrate 11 with channels 21 between adjacent wires, each wire including a layer of absorptive material 33 sandwiched between layers of reflective material 22 and 34.

Figure 8:
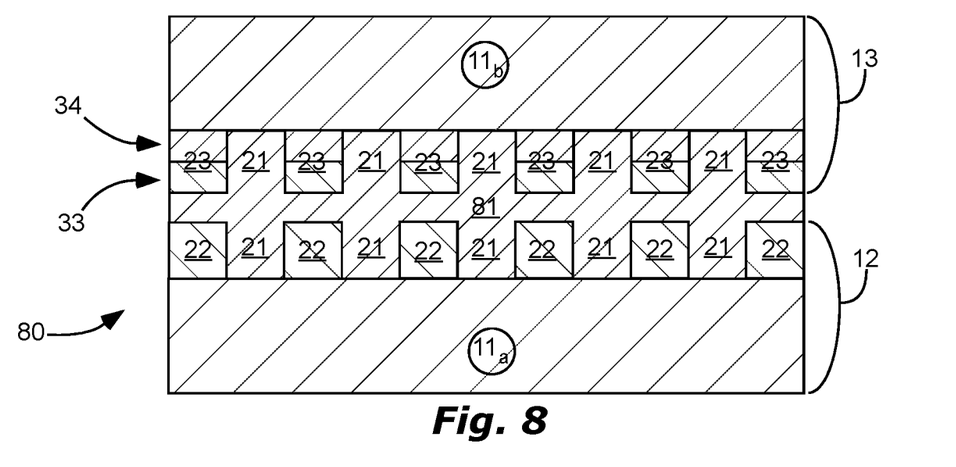
FIG. 8 is a schematic, cross-sectional side-view of a high-contrast polarizer 80 comprising a reflective polarizer 12 with an array of reflective wires 22 and an absorptive polarizer 13 with an array of absorptive ribs 23, the reflective polarizer 12 and the absorptive polarizer 13 mounted together with the wires 22 and the ribs 23 facing inward, in accordance with an embodiment of the present invention.

As shown in FIG. 8, a high-contrast polarizer 80 can comprise a reflective polarizer 12 and an absorptive polarizer 13. The reflective polarizer 12 can include an array of reflective wires 22 over a first substrate $11_a$ with channels 21 between adjacent wires 22. The absorptive polarizer can include an array of absorptive ribs 23 on a second substrate $11_b$ with channels 21 between adjacent ribs 23. In one embodiment, each absorptive rib 23 can include a layer of reflective material 34 sandwiched between a layer of absorptive material 33 and the second substrate $11_b$. The reflective polarizer 12 and the absorptive polarizer 13 can be mounted together with the array of reflective wires 22 and the array of absorptive ribs 23 facing inward and the first substrate 11$_a$ and the second substrate 11b facing outward. The reflective polarizer 12 and the absorptive polarizer 13 can be mounted together by an adhesive 81. The adhesive 81 can include spin-on-glass or sol-gel.

Figure 9:
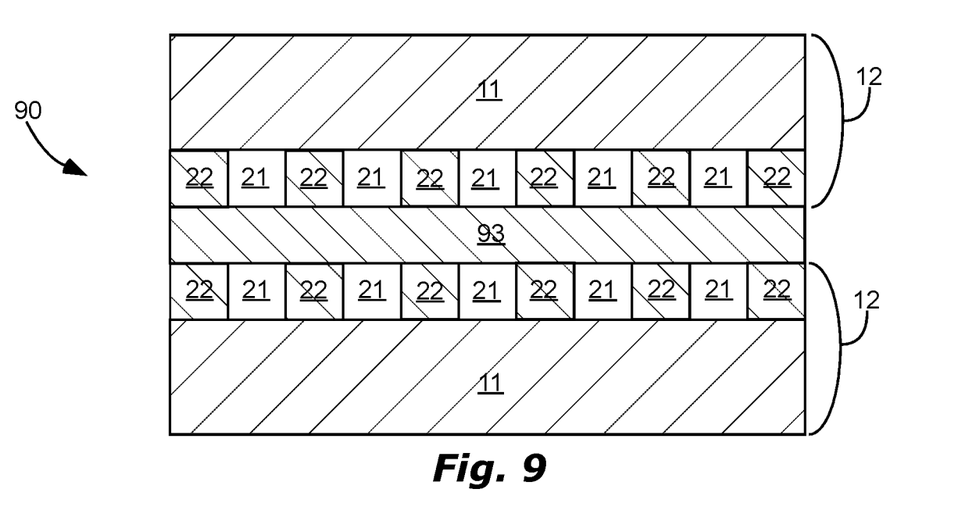
FIG. 9 is a schematic, cross-sectional side-view of a high-contrast polarizer 90 comprising a polymer film polarizer 93 sandwiched between a pair of reflective polarizers 12, in accordance with an embodiment of the present invention.

As shown in FIG. 9, a high-contrast polarizer 90 can comprise a polymer film polarizer 93 sandwiched between a pair of reflective polarizers 12. Each reflective polarizer 12 can include an array of reflective wires 22 on a substrate 11 with channels 21 between adjacent wires. An adhesive might be needed to bond the polymer film polarizer 93 to the reflective polarizers 12. The adhesive might extend into the channels 21.

The pair of reflective polarizers 12 and the polymer film polarizer 93 can be mounted together with the polymer film polarizer 93 sandwiched between the pair of reflective polarizers 12. The pair of reflective polarizers 12 can be oriented with the array of reflective wires 22 of both reflective polarizers 12 facing inward towards the polymer film polarizer 93. The substrate 11 of each reflective polarizer 12 can face outward. The array of reflective wires 22 of the pair of reflective polarizers 12 can be aligned and parallel with respect to each other.

In the various high-contrast polarizer embodiments described herein, the absorptive polarizer 13 can improve contrast in a polarizer that is used in a reflective-polarizer application. These high-contrast polarizer embodiments can be particularly beneficial if even relatively small amounts of leakage of the primarily-reflected polarization can interfere with the overall imaging system, such as by causing ghosting in the image or cross-talk.

Following are examples of performance of the various high-contrast polarizer embodiments described herein for light incident at 45° across a wavelength range of 450 nm to 700 nm. A percent reflection of s-polarization can be ≥70%, ≥80%, ≥90%, ≥95%, or ≥97%. A percent transmission of s-polarization can be ≤0.05%, ≤0.01%, or ≤0.005%. A percent transmission of p-polarization can be ≥70%, ≥80%, ≥90%, ≥95%, or ≥97%.

In the various high-contrast polarizer embodiments described herein, the reflective polarizer 12 and the absorptive polarizer 13 can be aligned with respect to each other for optimizing transmission of one polarization (e.g. p-polarized light) and for optimizing reflection or absorption of an opposite polarization (e.g. s-polarized light). Thus for example, the array of reflective wires 22 and the array of absorptive ribs 23 can be parallel with respect to each other. As another example, the array of reflective wires 22 and a polymer of a polymer film polarizer can be parallel with respect to each other.

Figure 10:
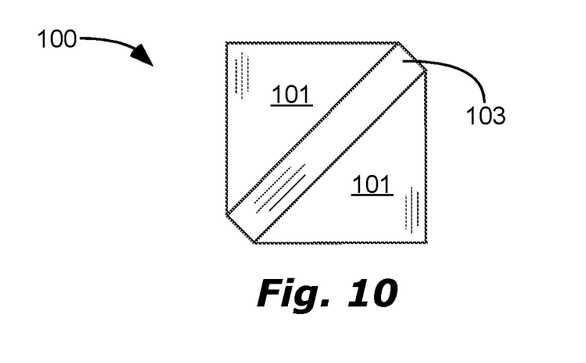
FIG. 10 is an end-view of a cube polarizing beam splitter 100 including a high-contrast polarizer 103 sandwiched between two prisms 101, in accordance with an embodiment of the present invention.

As shown in FIG. 10, a cube polarizing beam splitter 100 can comprise a high-contrast polarizer 103 sandwiched between a pair of prisms 101. The high-contrast polarizer 103 can be any embodiment described herein.

Figure 11:
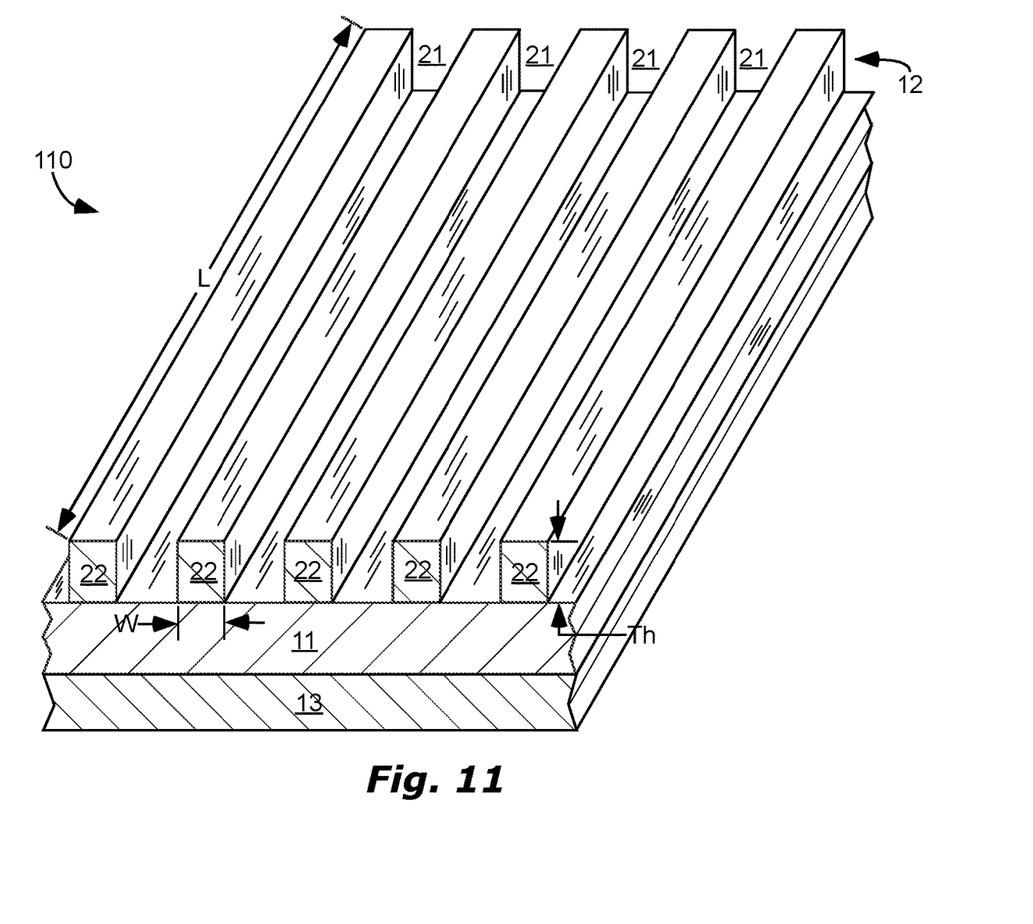
FIG. 11 is a schematic partial-perspective-view of a high-contrast polarizer 110, in accordance with an embodiment of the present invention.

FIG. 11 is a schematic partial-perspective-view of a high-contrast polarizer 110, showing the array of reflective wires 22. The array of reflective wires 22 and the array of absorptive ribs 23 of the high-contrast polarizers described herein can be elongated like the array of reflective wires 22 shown in FIG. 11. As used herein, the term "elongated" means that a length L of the wires is substantially greater than wire width W or wire thickness Th (e.g. L can be at least 10 times, at least 100 times, at least 1000 times, or at least 10,000 times larger than wire width W and/or wire thickness Th).

Figure 12:
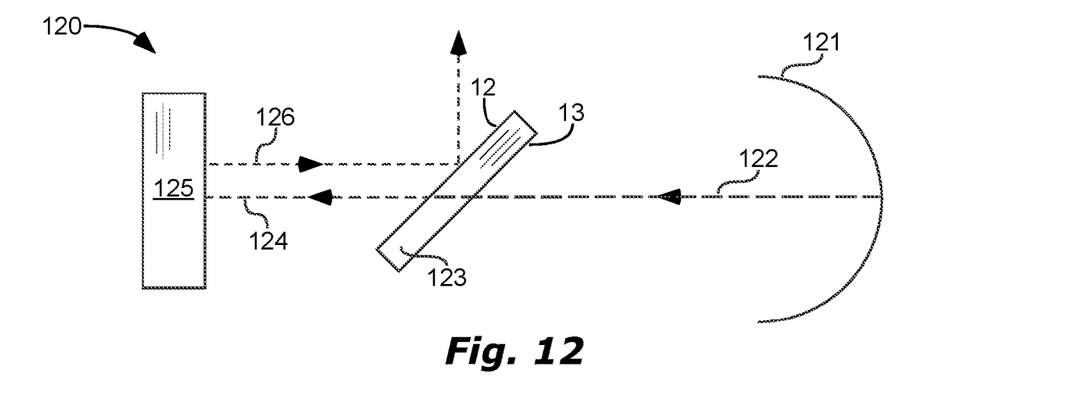
FIGS. 12-14 are schematic top-views of image projectors 120, 130, and 140, in accordance with embodiments of the present invention.

A high-contrast polarizer 123, according to an embodiment described herein, can be used in an image projector 120 as shown in FIG. 12. High-contrast polarizers 10, 20, 30, 40, 50, 60, or 70 might be particularly suitable for image projector 120. Image projector 120 can comprise a light source 121 capable of emitting a beam of light 122, a high-contrast polarizer 123, and a spatial light modulator 125. The high-contrast polarizer 123 can be located to receive the beam of light 122 with the absorptive polarizer 13 facing the light source, the high-contrast polarizer 123 configured to transmit at least a portion of the beam of light 122, forming a transmitted beam 124. The spatial light modulator 125 can be located to receive at least part of the transmitted beam 124. The spatial light modulator 125 can have a plurality of pixels, each pixel capable of receiving a signal and rotating a polarization of at least part of the transmitted beam 124 based on the signal. The spatial light modulator 125 can form an imaged beam 126 based on the signal of each pixel. The spatial light modulator 125 can be located and oriented to emit the imaged beam 126 to the reflective polarizer 12. The reflective polarizer 12 can reflect at least a portion of the imaged beam 126.

Figure 13:
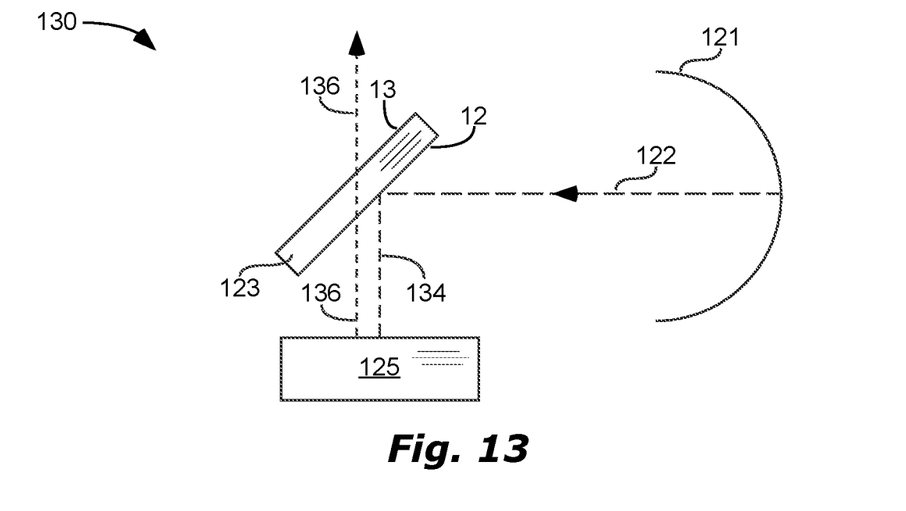

A high-contrast polarizer 123 according to an embodiment described herein can be used in an image projector 130 as shown in FIG. 13. High-contrast polarizers 10, 20, 30, 40, 50, 60, or 70 might be particularly suitable for image projector 130. Image projector 130 comprises a light source 121 capable of emitting a beam of light 122, a high-contrast polarizer 123, and a spatial light modulator 125. The high-contrast polarizer 123 can be located to receive the beam of light 122 with the reflective polarizer 12 facing the light source, the reflective polarizer 12 configured to reflect at least a portion of the beam of light 122, forming a reflected beam 134. The spatial light modulator 125 can be located to receive at least part of the reflected beam 134. The spatial light modulator 125 can have a plurality of pixels, each pixel capable of receiving a signal and rotating a polarization of at least part of the reflected beam based on the signal. The spatial light modulator 125 can form an imaged beam 136 based on the signal of each pixel and can be located and oriented to emit the imaged beam 136 to the reflective polarizer 12. At least a portion of the imaged beam 136 can transmit through the high-contrast polarizer 123.

Figure 14:
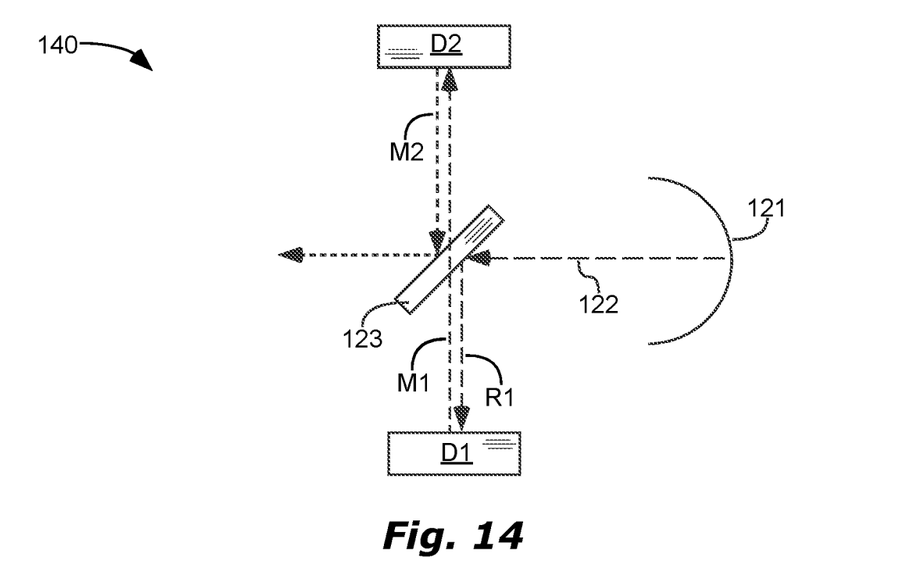

A high-contrast polarizer 123 according to an embodiment described herein can be used in an image projector 140 as shown in FIG. 14. High-contrast polarizers 80 or 90 might be particularly suitable for image projector 140. Image projector 140 comprises a light source 121 capable of emitting a beam of light 122, a high-contrast polarizer 123, a first device D1, and a second device D2. The first device D1, the second device D2, or both can be a spatial light modulator having a plurality of pixels, each pixel capable of receiving a signal and transmitting or reflecting incident light without causing a change in polarization, or rotating a polarization of the incident light, based on the signal. Typically, either the first device D1 or the second device D2 is a spatial light modulator and the other of these two devices D1 or D2 is a quarter wave plate and a light reflector.

The light source 121 can emit a beam of light 122. The high-contrast polarizer 123 can be located to receive the beam of light 122, can polarize the beam of light 122 to form a reflected beam R1 with a first polarization, and can reflect the reflected beam R1. The reflected beam R1 can thus be mostly the first polarization, such as ≥90%, ≥98%, ≥99%, or ≥99.5% the first polarization.

A first device D1 can be located to receive the reflected beam R1. The first device D1 can convert a polarization of at least part of the reflected beam R1 to a second polarization, the second polarization being opposite to the first polarization, thus forming a first-modified beam M1. The first device D1 can emit at least part of the first-modified beam M1 back to and through the high-contrast polarizer 123.

A second device D2 can be located to receive at least part of the first-modified beam M1. The second device D2 can convert a polarization of at least part of the first-modified beam M1 to the first polarization, thus forming a second-modified beam M2. The second device D2 can emit at least part of the second-modified beam M2 back to and reflect off of the high-contrast polarizer 123.

The spatial light modulators described above can have a plurality of pixels, each pixel capable of receiving a signal. The signal can be an electronic signal, Depending on whether or not each pixel receives the signal, or the strength of the signal, the pixel can rotate a polarization of, or transmit or reflect without causing a change in polarization of, a part of an incoming beam of light. The spatial light modulator can include liquid crystal and can be transmissive, reflective, or transflective.

What is claimed is:

1. An image projector comprising:
   a light source capable of emitting a beam of light;
   a high-contrast polarizer comprising (a) a reflective polarizer including an array of reflective wires over a first substrate, with channels between adjacent wires, (b) an absorptive polarizer including an array of absorptive ribs on a second substrate with channels between adjacent ribs, each absorptive rib including a layer of reflective material sandwiched between a layer of absorptive material and the second substrate, and (c) the reflective polarizer and the absorptive polarizer mounted together with the array of reflective wires and the array of absorptive ribs facing inward and the first substrate and the second substrate facing outward;
   the high-contrast polarizer located to receive the beam of light, capable of polarizing the beam of light to form a reflected beam with a first polarization, and capable of reflecting the reflected beam;
   a first device located to receive the reflected beam; capable of converting a polarization of at least part of the reflected beam to a second polarization, the second polarization being an opposite polarization to the first polarization, thus forming a first-modified beam; and capable of emitting at least part of the first-modified beam back to and through the high-contrast polarizer;
   a second device located to receive the first-modified beam; capable of converting a polarization of at least part of the first-modified beam to the first polarization, thus forming a second-modified beam; and capable of emitting at least part of the second-modified beam back to and reflecting off of the high-contrast polarizer; and
   the first device, the second device, or both is a spatial light modulator having a plurality of pixels, each pixel capable of receiving a signal and transmitting or reflecting incident light without causing a change in polarization, or rotating a polarization of the incident light, based on the signal.

2. The image projector of claim 1, wherein the reflective polarizer and the absorptive polarizer are mounted together by an adhesive.

3. The image projector of claim 2, wherein the adhesive is spin-on-glass.

4. The image projector of claim 2, wherein the adhesive is sol-gel.

5. The image projector of claim 1, wherein:
   the reflective wires and the layer of reflective material have k>0.1 and R>0.6 across a wavelength range of 450 nm to 700 nm;
   each absorptive rib having k>0.1 and R≤0.6 across a wavelength range of 450 nm to 700 nm; and
   R is calculated from the equation:

$$R = \frac{(n-1)^2 + k^2}{(n+1)^2 + k^2},$$

where n is a real part and k is an extinction coefficient of a refractive index of each transparent material of each reflective material.

6. The image projector of claim 1, wherein a length of the wires is at least 10 times larger than wire width.

7. The image projector of claim 1, wherein a length of the wires is at least 10 times larger than wire thickness.

8. The image projector of claim 1, wherein a length of the wires is at least 10 times larger than wire width.

9. The image projector of claim 7, wherein a length of the wires is at least 10,000 times larger than wire thickness and at least 10,000 times larger than wire thickness.

10. The image projector of claim 1, wherein the first device is a spatial light modulator and the second device is a quarter wave plate and a light reflector.

11. The image projector of claim 1, wherein the first device is a quarter wave plate and a light reflector and the second device is a spatial light modulator.

* * * * *